United States Patent Office 3,132,180
Patented May 5, 1964

3,132,180
CATALYTIC REDUCTION OF AROMATIC
MONONITRO COMPOUNDS
Eugene V. Hort, Plainfield, N.J., Harlan B. Freyermuth, Easton, Pa., and David E. Graham, Westfield, N.J., assignors to General Aniline & Film Corporation, New York, N.Y., a corporation of Delaware
No Drawing. Filed Mar. 29, 1961, Ser. No. 111,883
14 Claims. (Cl. 260—580)

This invention relates to an improved method for the reduction of aromatic mononitro compounds, and in particular to an improvement in the catalytic hydrogenation of aromatic monocyclic carbocyclic mononitro compounds to the corresponding amino compounds, and is further particularly concerned with an improved process whereby this reduction is carried out in the liquid phase and in the presence of the water of reaction as a second discrete liquid phase, no other solvent or diluent being added.

Aromatic nitro compounds have long been reduced to the corresponding aromatic amines by a great number of different methods, such as for example by the use of iron borings and dilute acid. In addition, zinc, tin and stannous chloride, with or without acid, alkaline sulfides and a great variety of other reducing agents have been used. New techniques have been developed within recent years employing molecular hydrogen with various catalysts to effect the direct reduction of nitro compounds to the amines. Such catalytic hydrogenation techniques offer many advantages over the previously employed chemical methods, especially with respect to economy, versatility, operating complexities, separation of products, and the ease of adaptation to continuous processing. Such catalytic hydrogenation techniques have been used with the aromatic nitro compounds in both the liquid and the vapor phase, and a great number of different catalyst systems have been suggested as suitable for the different techniques, primarily because of many inherent disadvantages which come to the front in the use of the catalytic hydrogenation technique. The major problems encountered in the catalytic reduction of aromatic nitro compounds are the fouling of the catalyst or its inactivation, and the production of undesired by-products and side reactions necessitating extremely careful control of operating conditions such as catalyst concentration, catalyst purity, purity of nitro compound, temperatures, pressures, selected solvents and diluents where employed, and the like. By far, the greatest difficulties have been encountered in preventing inactivation of the catalyst by products formed during the reaction such as water, and by the undesired by-products of the reaction which may result in forming undesirable high temperature build-up within the reaction zone in localized areas. Since the reduction of nitro compounds is an exothermic one, it has heretofore been considered essential to operate within careful limits of temperature in order to prevent a running away of the reaction with the possibility of a subsequent violent exothermic decomposition. To obviate such a situation, it has been proposed to employ various solvents and diluents in the reaction zone to moderate the rise of temperature during the reduction stages.

Among the catalyst systems most widely employed have been those using nickel or other base metals as the active catalytic material. These catalysts usually require rather drastic conditions of temperature and pressure and quite high concentrations of metal to effect the necessary and desired reduction of nitro compounds to the corresponding amines. One of the major factors in obtaining good yield of amine within reasonable conditions of temperature and pressure is adequate contact between the catalyst, the nitro compound and hydrogen within the reaction zone. Among the suggested methods for maintaining good contact has been the use of packed towers and other fixed bed catalyst systems wherein the flow liquid nitro compound and hydrogen is so provided as to result in a large contact area between the catalyst and the hydrogen and nitro compound. With the nickel catalyst systems heretofore employed it has been found that the water of reaction tends to cause agglutination of the catalyst and thus retard the speed of the reaction. To overcome this, various techniques have been devised, among them the removal of the water as vapor formed during the reaction to prevent the formation of a separate aqueous phase, see U.S. Patent 2,292,879. In U.S. Patent 2,458,214, control of the reaction temperature is effected by means of the injection of an inert liquid such as water into the reaction zone and the removal thereof in the form of steam so that there is no separate aqueous phase in the reaction zone.

It has now been discovered that mononitro compounds of the type hereinafter to be described may be catalytically hydrogenated and thereby reduced to the corresponding amino compound in undiluted form at moderate temperatures and pressures employing noble metal catalysts provided the reaction is carried out in a highly stirred reaction zone so that the water formed during the reaction remains well dispersed throughout the liquid in the reaction zone as a separate and distinct liquid phase. It is preferred that the reaction zone be further provided with some means of cooling to remove the heat of reaction. The process for this invention thereby provides a means for effecting reduction of aromatic mononitro compounds which eliminates the cost of solvents, the contamination of products by solvents, the poisoning of catalysts by solvents, the hazards of volatile inflammable solvents, the poisoning and inactivation of catalysts by undesirable by-products, the inactivation of the catalyst due to the water formed during their reduction, and finally, the need for elaborate and complex techniques for controlling the temperature of the reaction and the removal of the water formed during the reduction. The yields obtainable by the process of the present invention are substantially quantitative and the products produced thereby are of an excellent quality. It is indeed remarkable and completely unobvious that the hydrogenation can be carried out efficiently, simply, and safely by the process of the present invention and that it is not retarded in any way by the presence of the separate aqueous phase. Not only does this aqueous phase not interfere with the rate of reduction, and as a consequence provides a technique which effects a reduction at a constant rate, but it appears to offer many advantages by way of temperature control and the lack of reduction of any undesirable side reactions and reaction products. The present process is not only adapted for batch operation but it is particularly well suited to a continuous reduction technique.

It is therefore an object of the present invention to provide a process for the catalytic hydrogenation of aromatic mononitro compounds.

It is still another object of the present invention to provide a simple and efficient process for catalytically hydrogenating aromatic mononitro compounds in the liquid phase.

It is still another object of the present invention to provide a catalytic hydrogenation process for the production of aromatic carbocyclic monocyclic monoamines in the absence of any added solvent or diluent which is safe and efficient.

It is still a further object of the present invention to provide a process to effect the catalytic hydrogenation employing noble metal catalysts of aromatic mononitro monocyclic carbocyclic compounds in the absence of any added solvent or diluent which is safe and efficient and does not require complex techniques for removal of the water of reaction during the course of the reduction.

Other objects will appear hereinafter as the description proceeds.

The aromatic nitro compounds with which this invention is concerned are those characterized as monocyclic, carbocyclic mononitro compounds containing ether substituents and devoid of other substituents which would interfere with the reduction and may be structurally represented by the following formula:

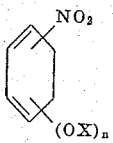

wherein X represents alkyl substituents of from 1 to about 18 carbon atoms and $n$ represents an integer of from 1 to 5, inclusive. Specific compounds including the following:

o-Nitro anisole
m-Nitro anisole
p-Nitro anisole
o-Nitro phenetole
m-Nitro phenetole
p-Nitro phenetole
2-nitro diphenylether
3-nitro diphenylether
4-nitro diphenylether
2,5-dimethoxy nitrobenzene The catalysts which are contemplated herein are the noble metals of the platinum group and include platinum, palladium, ruthenium and rhodium. The catalysts are usually employed on a suitable support in a concentration of from about 0.1% to about 10% by weight based on the weight of the support and preferably from about 1% to about 5%. Suitable supports are well known in the art and include carbon and alumina. The catalyst system employed should have a surface area of at least about 150 square meters per gram, which characterizes such catalysts as being of the high surface area type. Any of the standard preparations of catalyst may be used. The supported catalysts may be pelleted, granular or powder. They may be on the outside of the support or distributed throughout it. Some of the catalysts which may be employed are exemplified by the following:

Platinum black—Sabatier-Reid, Catalysis in Organic Chemistry, D. Van Nostrand Co., New York, 1922.
Platinum oxide—Adams, Voorhees and Shriner, Organic Syntheses, Coll. vol. 1, p. 452, John Wiley & Sons, New York, 1932.
Palladium on charcoal—Mannich & Thiele, Ber. Deutches pharm. Ges. 26, 36–48 (1916).
Platinum on charcoal—Ellis. U.S. Patent 1,174,245.
Platinum or palladium on alumina—Schwaroman, U.S. Patent 1,111,502.

As pointed out above, the present process employs no added solvent or diluent but is operable directly upon the undiluted nitro compounds. The temperature range suitable during the course of the reduction is from about 25° C. to about 125° C. and the pressure employed may range from atmospheric to about 150 pounds per square inch gage. Increased pressures may be used but since the rate of reaction is not to be increased, no advantage is to be gained thereby.

In order to effect the desired dispersion of the water formed during the course of the reaction throughout the reaction mass it is necessary to carry out the reaction in the presence of a high degree of suitable agitation. Any means for effecting a well dispersed state of water may be resorted to. In addition to the usual agitation means, one may also employ supersonics in lieu of conventional mechanical agitators. When employing the latter, a peripheral speeding within the liquid of about 500 to 800 feet per minute will produce a suitable and adequate dispersion of the water as a separate and distinct liquid phase.

The following examples will serve to illustrate the present invention without being deemed limitative thereof. Where parts are used, they are to be interpreted as parts by weight unless otherwise indicated.

*Example 1*

Into an 8 liter reactor there is charged 4500 g. of o-nitro anisole and 4.5 g. of a 5% palladium on carbon catalyst. The temperature of the reactor is then raised to 80° C. and pressured with hydrogen to 75 p.s.i.g. The reaction mixture is then stirred at 1500 r.p.m. to effect a dispersion throughout the reaction mass of the water as it is formed during the reduction. Hydrogen pressure is maintained at 75 p.s.i.g. by the introduction of hydrogen over a period of 4 hrs. Thereafter the reactants are cooled, discharged from the reactor, and filtered to separate the catalyst. The water of reaction is separated from the oil layer and distillation of the latter yields 3490 g. of o-anisidine with the following analysis:

Percent nitroanisole (titanous chloride)_____ Nil
Purity (diazo method)_____ 99.5%
Freezing point_____ 5.6°

The yield of o-anisidine is about 96.5%. The catalyst which is recovered is reused and shows virtually the same reactivity in subsequent runs.

*Example 2*

The procedure of Example 1 is repeated employing, however, 4500 g. of p-nitro phenetole. A yield of 3550 g. of p-phenetidine (96%) is obtained having the following analysis Percent nitrophenetole_____ Nil
Percent p-Phenetidine (diazo method)_____ 99.5

*Example 3*

Examples 1 and 2 are again repeated employing, however, 20 g. of the catalyst employed in those examples. The temperature of the reaction is maintained at about 50° C. in lieu of the 80° C. temperature of those examples. Excellent yields of high purity products are obtained.

*Example 4*

Example 1 is once again repeated carrying out the process, however, in a continuous manner using 20 g. of a 5% palladium-on-carbon catalyst for the initial charge of 4500 g. of o-nitro anisole. The throughput rate is maintained at 4000 g. of o-nitro anisole per hour using a temperature of 80° C. and 75 p.s.i.g. pressure. The catalyst is retained in the reactor by means of a microporous metal filter which permits withdrawal of product to the exclusion of the catalyst. A yield of better than 98% of o-anisidine containing less than 0.4% o-anisole is obtained in the effluent.

*Example 5*

Example 4 is repeated using a cascade series of two reactors in place of the single reactor of Example 4. The residence time is about an hour in the first reactor and in the second one about 30 minutes. The yield of o-anisidine is 99+% with no trace of the nitro compound. In the second reactor there is an initial charge of about 5 g. of the same catalyst used in the first reactor and this is retained in the reactor in a manner similarly as in the first one, namely, by a microporous metal filter.

*Example 6*

Example 5 is repeated except that in place of the metal filters in the reactor, the catalyst is permitted to flow from one reactor to the other and is withdrawn with the effluent from the second reactor and subsequently separated from the o-anisidine by centrifuging. The separated catalyst is recycled with fresh nitro feed to the first reactor. A small amount of make-up catalyst may be added as necessary to bring the initial concentration in the first reactor to the desired level of 20 g. per charge of nitro body. In the instant example, this would correspond to a concentration of about 0.1% catalyst based on the weight of the nitro compound.

*Example 7*

The procedure of Example 1 is carried out again using a charge of 4500 g. of p-nitro anisole with 25 g. of 0.5% platinum-on-alumina catalyst. The reactor is maintained at 45° C. with a pressure of 45 p.s.i.g. for 12 hours. An excellent yield of p-anisidine is obtained.

*Example 8*

Examples 1 and 6 are repeated employing in place of the nitro compound described therein, the following:

(a) o-Nitro phenetole
(b) 2-nitro diphenylether
(c) 2,5-dimethoxy nitrobenzene

The yields in each instance are excellent.

It is of course understood that the catalysts employed in the above examples are all characterized by having surface areas as herein described of at least about 150 square meters per gram.

Other variations in and modifications of the described processes which will be obvious to those skilled in the art can be made in this invention without departing from the scope or spirit thereof.

We claim:
1. A method for reducing aromatic, monocyclic, carbocyclic, mononitro ethers selected from the group consisting of alkyl and phenyl ethers to the corresponding amino compounds in the absence of added solvent which comprises reducing the said nitro compounds in the liquid phase with hydrogen in the presence of a noble metal catalyst of the platinum group having a surface area of at least about 150 square meters per gram at a temperature of from about 25° C. to about 125° C. and maintaining the water of reaction as a well dispersed separate liquid phase in the reaction zone during the reduction.

2. A continuous method for reducing aromatic, monocyclic, carbocyclic, mononitro ethers selected from the group consisting of alkyl and phenyl ethers in the absence of added solvent which comprises introducing in the liquid phase nitro compound, noble metal catalyst of the platinum group, and hydrogen into a reaction zone wherein the reactants are maintained in a high state of agitation and continuously withdrawing amino reduction product at a rate equivalent to the feed input rate of the reactants, the temperature of the reaction zone being maintained at about 25° C. to 125° C. and the said noble metal catalyst being characterized as having a surface area of at least about 150 square meters per gram, the water produced during the reaction being maintained as a separate liquid phase in the reaction zone during the reduction and being withdrawn from the said reaction zone only as amine reduction product is withdrawn.

3. A method for reducing aromatic, monocyclic, carbocyclic, mononitro ethers of the formula:

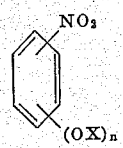

wherein X is alkyl and n is an integer from 1 to 5, inclusive, to the corresponding amino compounds in the absence of added solvent which comprises reducing the said nitro compounds in the liquid phase with hydrogen in the presence of a noble metal catalyst of the platinum group having a surface area of at least about 150 square meters per gram at a temperature of from about 25° C. to about 125° C. and maintaining the water of reaction as a well dispersed separate liquid phase in the reaction zone during the reduction.

4. A continuous method for reducing aromatic, monocyclic, carbocyclic, mononitro compound of the formula:

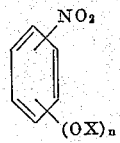

wherein X is alkyl and n is an integer from 1 to 5, inclusive, in the absence of added solvent which comprises introducing in the liquid phase nitro compound, noble metal catalyst of the platinum group, and hydrogen into a reaction zone wherein the reactants are maintained in a high state of agitation and continuously withdrawing amine reduction product at a rate equivalent to the feed input rate of the reactants, the temperature of the reaction zone being maintained at about 25° C. to 125° C. and the said noble metal catalyst being characterized as having a surface area of at least about 150 square meters per gram, the water produced during the reaction being maintained as a separate liquid phase in the reaction zone during the reduction and being withdrawn from the said reaction zone only as amine reduction product is withdrawn.

5. A method as defined in claim 1 wherein the nitro compound is o-nitro anisole.
6. A method as defined in claim 1 wherein the nitro compound is p-nitro phenetole.
7. A method as defined in claim 1 wherein the nitro compound is p-nitro anisole.
8. A method as defined in claim 1 wherein the nitro compound is 2-nitro diphenylether.
9. A method as defined in claim 1 wherein the nitro compound is 2,5-dimethoxy nitrobenzene.
10. A method as defined in claim 1 wherein the catalyst is a palladium-on-carbon catalyst.
11. A method as defined in claim 1 wherein the catalyst is a palladium-on-alumina catalyst.
12. A method as defined in claim 1 wherein the catalyst is a platinum-on-alumina catalyst.
13. A method for reducing an o-nitro anisole to o-anisidine in the liquid phase and in the absence of added solvent which comprises reducing the said o-nitro anisole with hydrogen in the presence of a palladium-on-carbon catalyst having a surface area of at least about 150 square meters per gram, the said reduction being carried out at a temperature of about 80° C. and maintaining the water of reaction as a well dispersed liquid phase in the reaction zone during the reduction.
14. A method as defined in claim 13 wherein the catalyst is a 5% palladium-on-carbon catalyst and the amount employed is about 0.1% by weight of catalyst based on the weight of the nitro compound.

References Cited in the file of this patent

UNITED STATES PATENTS 2,947,781    Spiegler  --------------- Aug. 2, 1960

FOREIGN PATENTS 786,407    Great Britain ---------- Apr. 30, 1956